Patented Oct. 11, 1938

2,133,037

UNITED STATES PATENT OFFICE 2,133,037

METHOD OF PRODUCING DIAZO-AMINO COMPOUNDS

Wendell W. Moyer, Syracuse, N. Y., assignor to The Solvay Process Company, New York, N. Y., a corporation of New York No Drawing. Application January 3, 1936, Serial No. 57,366

8 Claims. (Cl. 260—140)

This invention relates to a method for the preparation of diazo-amino compounds from primary amines.

The invention has for its object the preparation of diazo-amino compounds in a simpler, more efficient, and more inexpensive manner than heretofore accomplished.

In the past diazo-amino compounds have been prepared from primary aromatic amines by effecting diazotizing of the amine with sodium nitrite in acid solution, and treating the diazonium salt with an amine to produce the diazo-amino compound.

In accordance with the present invention I have found that primary aromatic amines may be reacted with nitrosyl chloride in the presence of a base to give directly a high yield of diazo-amino product.

Any suitable base may be employed for the purposes of the present invention. Thus, ammonia, sodium hydroxide, sodium carbonate, or lime may be used satisfactorily. I have found that an excess of the amine to be employed as the initial material may serve to advantage in this capacity. Where a base other than the amine is employed, the amine may be treated with around half a mol of NOCl per mol of amine. The amine may be dissolved in any suitable solvent and the nitrosyl chloride may be passed thereinto or the nitrosyl chloride and the amine may be simultaneously introduced into the solvent. The amount of base present should be sufficient to maintain the solution neutral or slightly alkaline during the reaction. The base may be added entirely at the beginning of the reaction or may be added gradually during the addition of NOCl. Where the amine is employed as the base, it is of course necessary to increase the amount thereof so that in addition to two mols of amine for each mol of NOCl employed sufficient excess amine is present to form with liberated hydrochloric acid the amine hydrochloride. This latter modification of the invention, wherein an excess of the amine is employed as the base, is especially applicable to the preparation of amino azo compounds since the diazo-amino compound in admixture with the amine hydrochloride resulting from the treatment with nitrosyl chloride may be converted to the corresponding amino azo compound merely by warming the mixture to a temperature around 40° C. or higher.

The following specific examples will serve to illustrate the present invention:

*Example 1.*—Into a solution of two mols of aniline and one mol NH₃ in 300 mols of water, maintained at 15° C., 1.17 mols of NOCl were passed at the rate of 0.67 mol per hour. During the addition the solution was subjected to continuous agitation to effect thorough admixture and prevent localized overheating. Solid diazo-amino-benzene

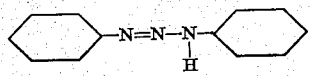

was formed as a precipitate during the reaction and, upon completion of the NOCl addition, was separated from the liquid by filtration. The solid product thus obtained represented a yield of 80% based upon the aniline employed. In lieu of NH₃ any other suitable base may be employed, for instance NaOH or Na₂CO₃.

*Example 2.*—One mol of NOCl was added at a flow rate of 0.2 mol per hour with vigorous striring to 7 mols of aniline maintained at 20° C. In this case the excess aniline preserved the alkalinity of the solution during the reaction. The resulting mixture, which consisted of a solution of diazo-amino-benzene and aniline hydrochloride in aniline, was then gradually warmed to 40° to 50° C. and allowed to cool slowly to 20° C. over a period of 17 hours. The yield of amino-azo-benzene was 86%, based on the NOCl used.

The molar or formula ratio of nitrosyl chloride to amine should not be in great excess of one to two as the excess NOCl may yield a diazonium salt instead of the desired diazo-amino compound. A ratio as high as 1.3 to 2 may be employed, however, without formation of a substantial quantity of the diazonium salt. The ratio may be much less than one to two as in the case where the amine is employed to bind hydrochloric acid, but where another base, say an inorganic base, is employed for this purpose, it is desirable to employ an NOCl: amine ratio of at least ½.

The temperature of the reaction mixture is preferably maintained low, i. e. is not allowed to rise substantially above about 20° C., in order to prevent premature rearrangement and formation of undesired by-products.

I claim:

1. The method of preparing a diazo-amino compound from a primary aromatic amine, which comprises introducing NOCl into intimate contact with the arylamine in a formula ratio of not more than about 1.3 to 2 and maintaining sufficient base present to bind hydrochloric acid formed during the reaction.

2. The method of preparing a diazo-amino compound from primary arylamine, which comprises bringing nitrosyl chloride into intimate contact with the amine in a formula ratio of about ½ in the presence of sufficient ammonia to react with the hydrochloric acid formed during the reaction.

3. The method of preparing a diazo-amino compound from a primary arylamine, which comprises introducing about ½ mol of NOCl into a solution of a mol of the primary arylamine and ½ mol of ammonia at a temperature not in excess of about 20° C.

4. The method of preparing a diazo-amino compound from a primary arylamine, which comprises introducing NOCl into intimate contact with the primary arylamine and maintaining sufficient of the primary arylamine in excess of one mol arylamine to ½ mol NOCl to react with hydrochloric acid formed during the reaction.

5. The method of preparing a diazo-amino compound from a primary arylamine, which comprises introducing about one mol of NOCl into intimate contact with about 7 mols of the primary amine at a temperature not exceeding about 20° C.

6. The method of preparing an amino-azo compound from a primary arylamine, which comprises introducing NOCl into intimate contact with the primary arylamine at a temperature not exceeding about 20° C. and maintaining sufficient of the primary arylamine in excess of one mol arylamine to ½ mol NOCl to react with hydrochloric acid formed during the reaction, and heating the resultant reaction mixture to a temperature above about 40° C.

7. The method of preparing diazo-amino-benzene from aniline, which comprises introducing about 1 mol of NOCl into intimate contact with about 7 mols of aniline at a temperature not exceeding about 20° C.

8. The method of preparing amino-azo-benzene from aniline, which comprises introducing about 1 mol of NOCl into intimate contact with about 7 mols of aniline at a temperature not exceeding about 20° C., and heating the resultant reaction mixture to a temperature above about 40° C.

WENDELL W. MOYER.